March 8, 1960  R. G. IAPADRE  2,927,675
COIN-ACTUATED CONCEALED TIMER FOR PARKING METER
Filed June 13, 1957  4 Sheets-Sheet 1
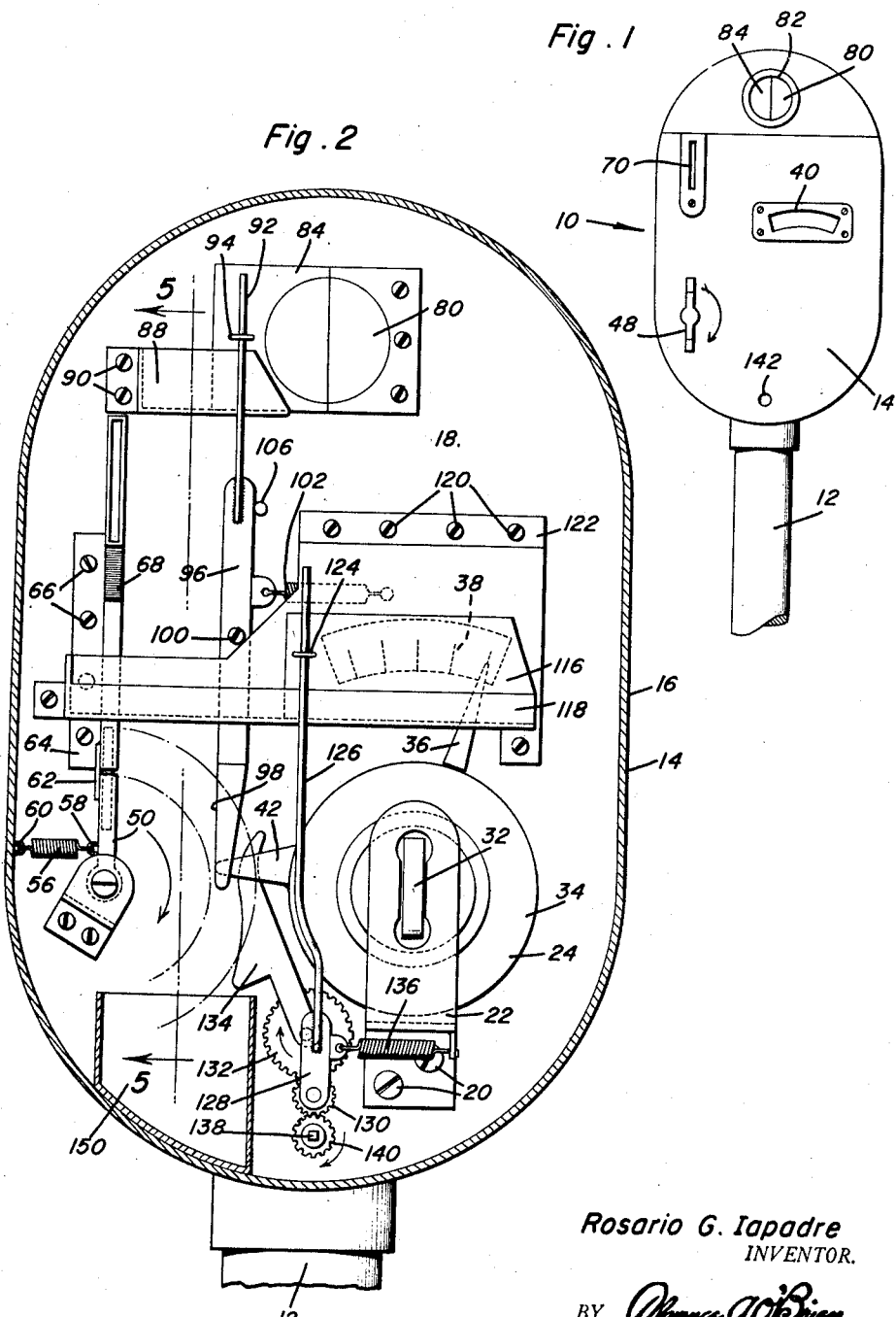
Rosario G. Iapadre
INVENTOR.

March 8, 1960

R. G. IAPADRE 2,927,675

COIN-ACTUATED CONCEALED TIMER FOR PARKING METER

Filed June 13, 1957

Rosario G. Iapadre
INVENTOR.

March 8, 1960　　　　R. G. IAPADRE　　　　2,927,675
COIN-ACTUATED CONCEALED TIMER FOR PARKING METER
Filed June 13, 1957　　　　　　　　　　　　　4 Sheets-Sheet 3

Rosario G. Iapadre
INVENTOR.

BY

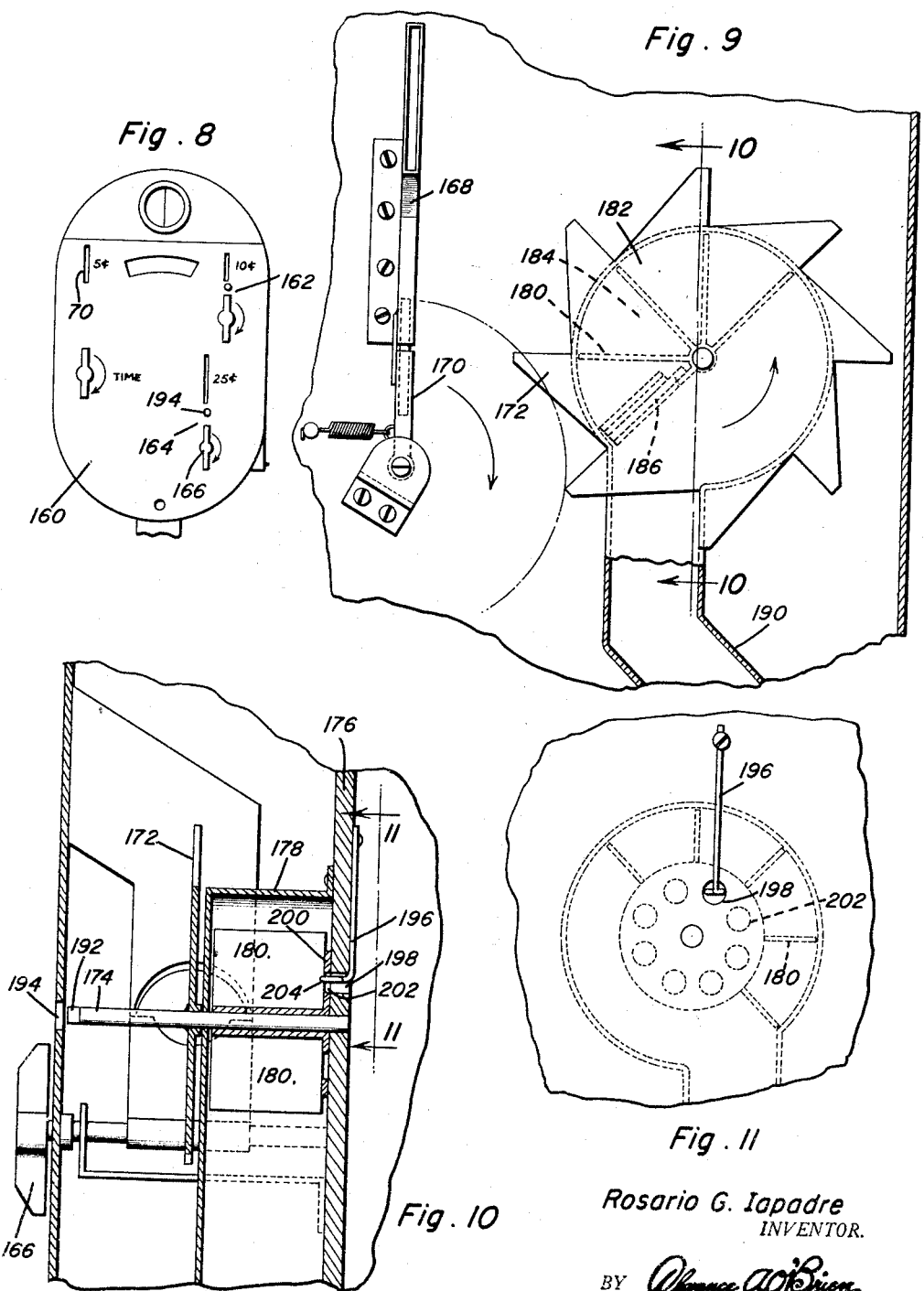

United States Patent Office 2,927,675
Patented Mar. 8, 1960

2,927,675

COIN-ACTUATED CONCEALED TIMER FOR PARKING METER

Rosario G. Iapadre, Indiana, Pa.

Application June 13, 1957, Serial No. 665,477

8 Claims. (Cl. 194—88)

This invention relates to parking meters and more particularly to novel actuating means for a timer of a parking meter having means for concealing the timing scale.

The primary object of the present invention resides in the provision of means for effectively insuring that each motorist who parks a vehicle in a parking location controlled by a parking meter will deposit a coin in the parking meter and not merely park the vehicle using the unexpired time remaining from the parking rights paid for by the previous motorist.

Construction of this invention features the utilization of means for concealing the timing scale of the parking meter so that a motorist will have no way of knowing the amount of unexpired time remaining on the parking meter until the motorist has deposited a coin in the parking meter to open a shutter concealing the timing scale. This will, of course, render it far less likely that a motorist would chance utilizing the unexpired time remaining on the parking meter since such may be too short a period of time for the motorist to accomplish his purpose and return to his vehicle without a violation being indicated on the parking meter.

Another object of the present invention resides in the provision of a novel violation indicator operable by the coin receiver to withdraw the indicator from a violation indicating position to a position wherein a timer employing cam means will hold the indicator out of the violation indicating position until the expiration of a predetermined period of time.

Another feature of the invention lies in the provision of novel coin changing means which may be associated with the timer and which may be utilized in connection with the coin receiver to not only actuate the coin changing means but to also allow the coin receiver to actuate the other elements of the invention.

These, together with the various ancillary objects and features of the invention which will become apparent as the following description proceeds, are attained by this parking meter, preferred embodiments of which have been illustrated in the accompanying drawings, by way of example only, wherein:

Figure 1 is an elevational view of the head of the parking meter comprising the present invention;

Figure 2 is a vertical sectional detail view in an enlarged scale of the parking meter head illustrating the various components of the parking meter prior to actuation and in a violation indicating position;

Figure 8 is an elevational view of a modified form of parking meter employing coin changing means;

Figure 9 is a partial sectional detail view illustrating in particular the construction of the coin changing means utilized in this form of the invention;

Figure 10 is a transverse sectional detail view as taken along the plane of line 10—10 in Figure 9 illustrating the interior construction of the coin changing wheels; and Figure 11 is a detail view illustrating the construction of the latching means for the coin changing wheel.

Figure 4:
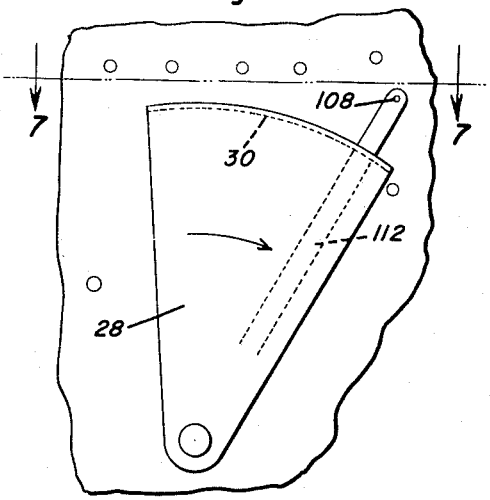
Figure 4 is a sectional detail view illustrating the construction of the cam means for holding the violation indicator in a non-violation indicating position.

With continuing reference to the accompanying drawings wherein like reference numerals designate similar parts throughout the various views, reference numeral 10 generally designates the parking meter comprising the present invention which includes a conventional stand 12 having a parking head 14 of any suitable configuration mounted thereon. Parking head 14 includes a housing 16 which may be provided with a removable back and any suitable access openings closable by locks, not shown, or the like as may be desired. Mounted within the housing 16 is a partition wall 18 carrying the major operating components of the invention.

Secured to the partition 18 by means of fasteners 20 is a bracket 22 supporting a timer 24 of conventional construction which drives a shaft 26 actuating an arm 28 carrying a cam 30. Further, there is mounted on the timer 24 and forming a portion thereof an outer rotating portion 34 about the stationary central portion 32 held in place by the bracket 22. The portion 34 has a pointer 36 secured thereto and rotatable therewith which pointer 36 cooperates with a timing scale 38. The timing scale 38 is positioned in alignment with a window 40 formed in the housing 16. Also rotatable with the outer portion 34 of the timer 24 is a cam member 42.

Rotatably mounted in the housing 16 is a shaft 46 held in the partition 18 and in the wall of the housing 16 and adapted to be rotated by means of a handle 48. Rotatable with the shaft 48 is a coin receiver 50 having a recess 52 for receiving a coin. A coin 54 is adapted to be received in the recess. A spring 56 secured at one end to an eye 58 on the coin receiver 50 and at the other end to an eye 60 of the housing continuously urges the coin receiver 50 to the position as is shown in Figure 1 and against a stop 62 affixed to a bracket 64. The bracket is fastened by screws 66 or the like to the partition 18 and supports a chute 68 communicating with an opening 70 opening into the housing 16 whereby a coin deposited in the opening 70 will be directed by the chute into the coin receiver 50.

Figure 3:
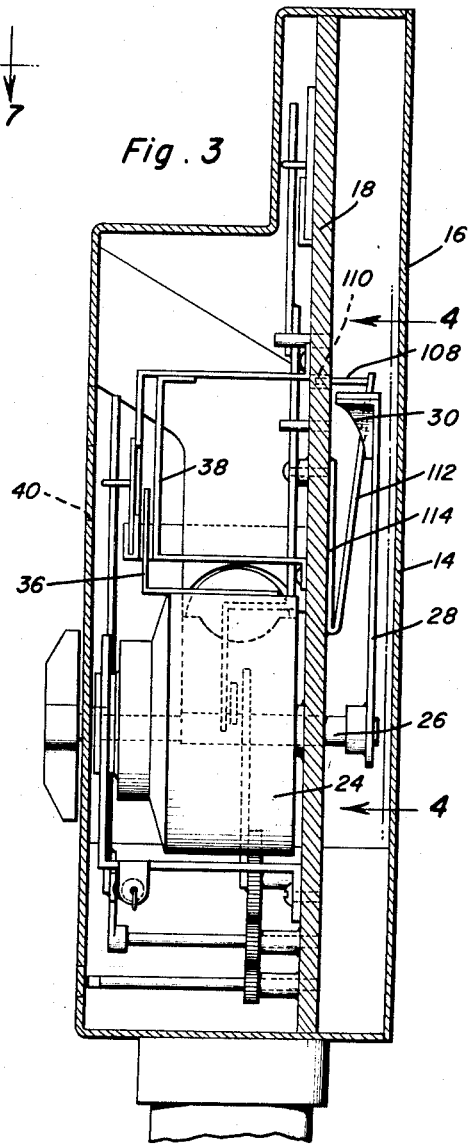
Figure 3 is a transverse vertical sectional detail view in an enlarged scale of the parking meter head.
Figure 5:
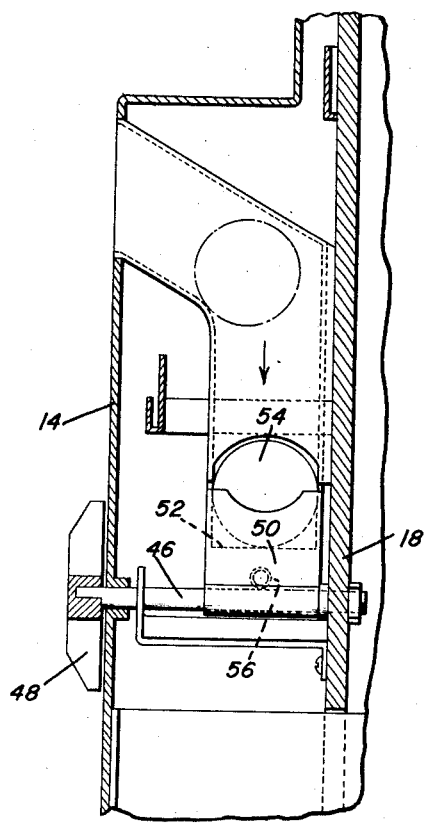
Figure 5 is a sectional detail view as taken along the plane of line 5—5 in Figure 2 illustrating in particular the construction of the coin chute and coin receiver.
Figure 6:
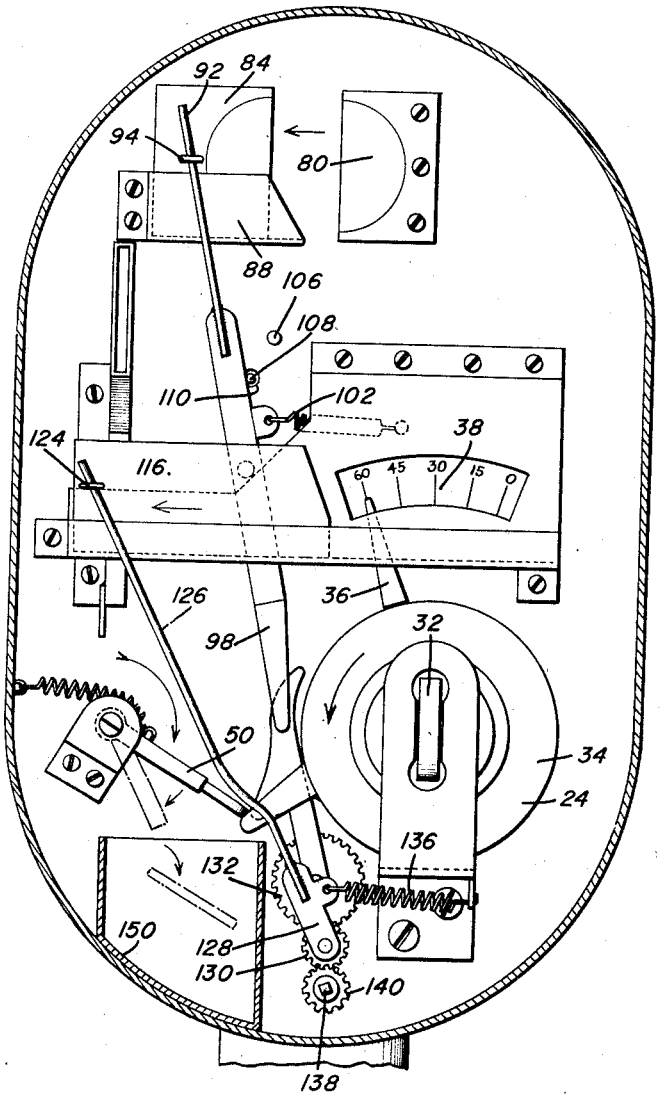
Figure 6 is a sectional detail view similar to that of Figure 2 but illustrating the various component elements of the parking meter in an actuated position.
Figure 7:
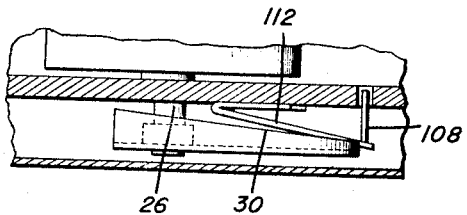
Figure 7 is a sectional detail view as taken along the plane of line 7—7 in Figure 4.

Provided in the upper portion of the head 14 is a stationary indicator section 80 in alignment with a window 82. A movable indicator section 84 which when in alignment and abutting the fixed indicator section 80 provides an indication of violation is slidably mounted in a channel-shaped guide 88 fixed to the partition 18 by means of fasteners 90. A rod 92 extends through an eye 94 forming a loose pivotal and rockable connection between the indicator section 84 and the rod 92. The rod 92 is fixed to a lever 96 having a lower cam portion 98 adapted to be engaged by the coin receiver 50 to pivot the lever 96 about pivot point 100. A spring 102 is connected to the lever 96 and to the partition 18 or elsewhere for the purpose of returning and continuously urging the lever 96 to the violation indicating position as is shown in Figure 2. A stop 106 is provided as a limiting position for the movable indicator 84 by engagement with the lever 96. A movable stop 108 which is extendible through an aperture 110 in the partition 18 is provided. The stop 108 is adapted to engage the lever 96 to hold it in the position as is shown in Figure 6 with the cam engaging the spring-like arm 112 which is fixed to the partition by means of the portion 114 upon actuation of the timer 24, the cam 30 cooperating with the timer as heretofore explained. When however the cam 30 releases the arm 112 it will spring to the position as is shown in Figure 3 withdrawing the stop 108 through the aperture 110 and allowing the spring 102 to return the lever 96 and hence the indicator section 84 to the position as is shown in Figure 2.

There is provided a shutter 116 which is adapted to close the window 40 which shutter 116 forms an important element of the invention. The shutter 116 is adapted to ride in the channel guide 118 provided therefor and held by means of fasteners 120 to the partition 18. The channel shaped guide is associated with and carries by means of the brackets held by the fastener 120 and indicated at 122 the timing scale 38. Hence, when the shutter is in the closed postion as is shown in Figure 2, it is not possible to see the timing scale from the outside of the housing. The shutter carries an eye 124 through which a rod 126 forming a portion of a linkage extends. The rod 126 has an end member 128 at its lower section having a gear 130 fixed thereto. The gear 130 is adapted to be engaged by a larger gear 132 carried by a cam arm 134 adapted to be engaged by the coin receiver 50 during its rotation which will cause the rotation of the gear 132 and hence the rotation of the gear 130 to withdraw the shutter 116 during the downward movement of the coin receiver. When the coin receiver is released, the arm 134 will subsequently be released and spring 136 provides means for returning the linkage to the position as is shown in Figure 2. In order to open the shutter 116 there is provided a key actuated square shaft 138 for rotating the gear 140 which meshes with gear 130 so that the shutter 116 may be temporarily withdrawn by an officer or other authorized person having the key for checking the meter. It is noted that the key may be inserted through an opening 142 in the housing 16.

In operation, a coin is deposited in the chute 68 and falls into the coin receiver 50. Then, rotation of the handle 48 will cause the coin receiver to abut against the cam ends 98, 42, and 134 actuating these particular members to move the indicator section 84 to a non-violation indicating position where it is held by the detent 108. Further, the movement of the coin receiver 50 will cause the cam end 134 to be engaged thus causing the gear 132 to be rotated rotating the gear 130 and withdrawing the shutter 116 so that the motorist can then determine how much time he has on hand, it being noted that the timer 34 may be graduated in increments depending upon the number of coins that are placed successively in the coin receiver 50. In addition, engagement with the cam end 42 will actuate the timer 34 and cause the pointer 36 to move while further causing actuation of the cam 30 so that it may engage and hold the locking detent 108 for the indicator in position. The clockwork mechanism of the timer 24 will then function and will eventually cause release of the indicator 84 so as to indicate violation when the pointer 36 has reached zero. It is noted that after the coin receiver has been completely rotated, the coin is deposited in a coin receptacle 150 access to which may be had upon opening of the housing 16.

As is shown in Figures 8-11, a modified form of the invention may be utilized as indicated by reference numeral 160. While all the actuation elements of the invention are similar, there is provided means for affording the motorist adequate change to deposit in the coin opening 70. This is provided by means of coin changers for ten cent pieces as indicated at 162 and for quarters as indicated at 164. The coin changer for the quarter pieces is illustrated in Figures 9, 10 and 11, it being noted that a handle 166 of the coin changer may be arranged so as to be the actuation mechanism of the device with only the remainder of the change from the machine being given back to the motorist retaining that portion of the change as the fee to actuate the mechanism. It is noted that each of the change mechanisms includes a coin chute as indicated at 168 of similar construction to the coin chute 60 which deposits the coin in a coin receiver 170 of similar construction to the coin receiver 50. Rotation of the handle as at 166 will cause the coin receiver 170 to abut against the wheel 172 fixed on a shaft 174 journaled in the partition 176. The shaft has affixed thereto a cylinder 178 having a plurality of compartment forming sections as at 180 arranged annularly thereabout dividing the cylinder 178 into a plurality of compartments as indicated at 184. Deposited in each of the compartments 184 are suitable coins 186. The cylinder 178 is fixed to the partition 176 while the partitions 180 are fixed to the rotatable shaft 174. Hence, upon rotation of the toothed wheel 172 due to actuation thereof by the coin receiver 170, with the coin therein, the coin engaging the teeth of the wheel 172, the shaft 174 will rotate changing the position of the partitions 180 with respect to the cylinder 178 and eventually depositing the coins in the chute 190 where the change is returned to the user. It is to be recognized that any suitable number of partitions may be made and that the shaft 174 may be provided with a square end 192 in alignment with an opening 194 in the housing thereby enabling the shaft 174 to be rotated by a person having the key for the shaft 174 thus permitting the contents of the compartments to be withdrawn if so desired. Further, this enables the convenient refilling of the compartments by increment rotation after all of the coins have been discharged and the entire arrangement of the partitions 180 have been rotated 180° from the position as shown in Figure 9.

A ratchet arrangement for lockingly holding the partitions in a step-by-step arrangement is provided by the spring pressed member 196 which extends through an opening 198 in the partition 176 and into engagement with a disc 200 fixed to the partitions 180. The disc 200 has a series of apertures 202 therein into which the detent portion of the member 196 as indicated at 204 extends. These apertures 202 are adapted to align with the aperture 198.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, said shutter having a linkage pivoted thereto, means engageable with said linkage for opening said shutter, said linkage including gears, and a key actuated gear for separately operating said shutter meshing with one of said gears.

2. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting of said coin receiver to actuate said timer and open said shutter said linkage including gears, and a key actuated gear for separately operating said shutter meshing with one of said gears, an indicator for indicating expiration of a period of time in an indicating position, said indicator having a lever pivotally mounted in said head, said lever being engageable by a coin in said coin receiver to move said indicator out of the indicating position, a latch for holding said indicator out of the indicating position engageable with said indicator, and a cam operated by said timer engaging said latch for disengaging said latch from said indicator.

3. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting of said coin receiver to actuate said timer and open said shutter said linkage including gears, and a key actuated gear for separately operating said shutter meshing with one of said gears, an indicator for indicating expiration of a period of time in an indicating position, said indicator having a lever pivotally mounted in said head, said lever being engageable by a coin in said coin receiver to move said indicator out of the indicating position, a latch for holding said indicator out of the indicating position engageable with said indicator, a cam operated by said timer engaging said latch for disengaging said latch from said indicator, said head having a channel guide therein, said indicator being slidable in said channel guide.

4. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting of said coin receiver to actuate said timer and open said shutter, said linkage including gears, and a key actuated gear for separately operating said shutter meshing with one of said gears.

5. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting of said coin receiver to actuate said timer and open said shutter, said linkage including gears, and a key actuated gear for separately operating said shutter meshing with one of said gears, spring means for returning said coin receiver to an initial position connected to said coin receiver, and spring means continuously urging said shutter to a closed position between said window and said timing scale connected to said linkage.

6. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting by said coin receiver to actuate said timer and open said shutter, an indicator for indicating expiration of a period of time in an indicating position, said indicator having a lever pivotally mounted in said head, said lever being engageable by a coin in said coin receiver to move said indicator out of the indicating position, a latch for holding said indicator out of the indicating position engageable with said indicator, a cam operated by said timer engaging said latch for disengaging said latch from said indicator, said head having a channel guide therein, said indicator being slidable in said channel guide, said linkage including gears, and a key actuated gear for separately operating said shutter meshing with one of said gears, spring means for returning said coin receiver to an initial position connected to said coin receiver, and spring means continuously urging said shutter to a closed position between said window and said timing scale connected to said linkage.

7. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting of said coin receiver to actuate said timer and open said shutter said linkage including gears, and a key actuated gear for separately operating said shutter meshing with one of said gears, coin changing means in said head, a discharge chute in said head communicating with said coin changing means, said coin receiver upon rotation causing a coin carried thereby to engage and actuate said coin changing means.

8. A parking meter comprising a head enclosing a timer, said head having a window, a timing scale in said head in alignment with said window, a pointer connected to and actuated by said timer cooperating with said timing scale, a shutter movably mounted in said head, said shutter being movable into a position between said window and said timing scale, a coin opening in said head, a chute in said head in alignment with said coin opening, a coin receiver pivotally mounted in said head and adapted to receive coins from said chute, said timer having an actuating member connected thereto, said shutter having a linkage pivoted thereto, said actuating member and said linkage being engageable by a coin in said coin receiver upon pivoting of said coin receiver to actuate said timer and open said shutter, an indicator for indicating expiration of a period of time in an indicating position, said indicator having a lever pivotally mounted in said head, said lever being engageable by a coin in said coin receiver to move said indicator out of the indicating position, a latch for holding said indicator out of the indicating position engageable with said indicator, a cam operated by said timer engaging said latch for disengaging said latch from said indicator, said head having a channel guide therein, said indicator being slidable in said channel guide, said linkage including gears, and a key actuated gear for separately operating said shutter meshing with one of said gears, spring means for returning said coin receiver to an initial position connected to said coin receiver, and spring means continuously urging said shutter to a closed position between said window and said timing scale connected to said linkage, coin changing means in said head, a discharge chute in said head communicating with said coin changing means, said coin receiver upon rotation causing a coin carried thereby to engage and actuate said coin changing means.

References Cited in the file of this patent

UNITED STATES PATENTS

| | | |
|---|---|---|
| 351,989 | Mangan | Nov. 2, 1886 |
| 2,070,445 | Miller | Feb. 9, 1937 |
| 2,122,973 | Beverly | July 5, 1938 |
| 2,171,345 | Rockola | Aug. 29, 1939 |
| 2,229,183 | Mitchell | Jan. 21, 1941 |
| 2,551,914 | Trier | May 8, 1951 |
| 2,618,371 | Broussard | Nov. 18, 1952 |